US010063690B2

(12) United States Patent
Schalk et al.

(10) Patent No.: US 10,063,690 B2
(45) Date of Patent: Aug. 28, 2018

(54) NETWORK ELEMENT (71) Applicant: Adtran, Inc., Huntsville, AL (US)

(72) Inventors: Ruediger Schalk, Greifswald (DE); Matthias Ninnemann, Neuenkirchen (DE); Henry Weinitschke, Behrenhoff (DE); Tim Eickelberg, Greifswald (DE)

(73) Assignee: Adtran Inc., Huntsville, AL (US)

( * ) Notice: Subject to any disclaimer, the term of this patent is extended or adjusted under 35 U.S.C. 154(b) by 0 days.

(21) Appl. No.: 15/084,772

(22) Filed: Mar. 30, 2016

(65) Prior Publication Data

US 2016/0295011 A1 Oct. 6, 2016

Related U.S. Application Data (60) Provisional application No. 62/140,226, filed on Mar. 30, 2015.

(51) Int. Cl.
*H04L 12/28* (2006.01)
*H04M 3/00* (2006.01)
*H04Q 3/60* (2006.01)
*H04M 11/06* (2006.01)

(52) U.S. Cl.
CPC ........... *H04M 3/007* (2013.01); *H04M 11/06* (2013.01); *H04Q 3/60* (2013.01); *H04Q 2213/13076* (2013.01)

(58) Field of Classification Search
USPC ......... 379/90.01–108.02; 709/250, 227–228; 370/216–271
See application file for complete search history.

(56) References Cited

U.S. PATENT DOCUMENTS 6,874,041 B1 * 3/2005 Burd .................. H04Q 11/0421
709/227
8,693,374 B1 * 4/2014 Murphy .................. H04L 12/28
370/255

(Continued)

FOREIGN PATENT DOCUMENTS

EP       1798993     6/2007
GB       2432746     5/2007
WO    2008074363    6/2008

OTHER PUBLICATIONS

European Search Report issued in EP Application No. 16162960.5 dated Aug. 19, 2016, 8 pages.

*Primary Examiner* — Maria El-Zoobi
(74) *Attorney, Agent, or Firm* — Fish & Richardson P.C.

(57) ABSTRACT

A network element is provided comprising at least one switch, which is configurable to connect a subscriber line to a first service line or to a second service line, wherein the connection of the subscriber line to the first service line or to the second service line is configured via a signal conveyed across the second service line. Also, a system is suggested comprising two or more switches, wherein each switch is configurable to connect a subscriber line to a first service line or to a second service line, a control circuitry for controlling the two or more switches, an MSAN comprising two or more second service lines, wherein a dedicated service line of an MSAN is used for controlling the control circuitry. Further, methods for operating the network element or the system are suggested.

17 Claims, 4 Drawing Sheets

(56) References Cited

U.S. PATENT DOCUMENTS

2006/0239244 A1* 10/2006 Hurst .................... H04L 12/10
   370/352
2008/0266059 A1   10/2008 Franzke
2009/0262912 A1* 10/2009 Bremer .................... H04L 5/16
   379/93.06

* cited by examiner

NETWORK ELEMENT

CROSS-REFERENCE TO RELATED APPLICATIONS

This application claims priority to U.S. Provisional Patent Application No. 62/140,226, filed on Mar. 30, 2015, entitled "Line Card controlled MDF-Switch," which is hereby incorporated by reference in its entirety.

BACKGROUND

This document relates to telecommunications networks and components. Telecommunications networks continue to evolve with service providers deploying more fiber to the curb (FTTC), fiber to the neighborhood (or node) (FTTN), and/or fiber to the premises (FTTP), while also maintaining existing ADSL/POTS networks.

SUMMARY

The document discloses a (communication) network element, in particular a cable node, as system comprising a cable node and methods for configuring such a network element.

The cable node may in particular a node in a telecommunication system that allows connecting subscriber loops or wires to the Internet.

Examples described herein can be used, e.g., by network operators which have a legacy ADSL/POTS network set up and are in the process of building a FTTC/FTTN network to deploy VDSL services to their customers.

A single subscriber may obtain its ADSL/POTS service over a long copper loop from a central office (CO). Implementations provided herewith allow the operator to flexibly switch the new service (e.g., VDSL2) to the subscriber line when the customer wants to obtain this new service. The customer may hence get the requested service either from the CO and/or from the FTTC/FTTN network.

Any manual and incremental rollout is time consuming and expensive. This in particular applies for single customers gradually choosing new services, which would then require an technician to approach the cable node and to manually patch the connection in the cable node. The cable node may be a DSLAM or any network node that provides connections to the customers.

Hence, it is an objective to flexibly and cost-efficiently control a cable node of a telecommunication network.

This is achieved according to the features of the independent claims. Further implementations result from the depending claims.

A network element is provided comprising:
at least one switch, which is configurable to connect a subscriber line to a first service line or to a second service line,
wherein the connection of the subscriber line to the first service line or to the second service line is configured via a signal conveyed across the second service line.

It is noted that each switch may be a relay, in particular a latched relay (with persistent states even if no power is supplied to the relay).

Hence, the switch can be controlled by, e.g., a VDSL line card of a DSLAM or a MSAN. In such case, no additional control equipment or control wiring is required. Existing line cards may be used; in particular, no redesign is required, a software upgrade of the line card may suffice. The approach allows for a compact design with a built-in POTS-splitter, which is beneficial with regard to the overall space required.

It is also an option that the switch can be controlled via a line connected to a CO. In such case, the second service line is connected to the CO. Hence, the POTS or ADSL service may be used to convey an information that allows switching to configure the setting of the switch connecting the subscriber line to the first or the second service line.

Subscribers can be individually plugged onto the VDSL line via the switch; this bears the advantage of a freely and flexibly scalable solution.

Advantageously, a rollout to an FTTC/FTTN node to manually patch the subscriber line onto the VDSL port is no longer required. This allows the operator so provide a cost efficient, flexible and quick migration of a subscriber or a group of subscribers to new services, e.g., VDSL or VDSL2.

The solution provided also bears the advantage that a technician does not have to go to the actual FTTC/FTTN cabinet to manually patch a subscriber line onto a new service port. Instead, the configuration can be remotely updated via a network management center.

In some implementations, the network element is a cable (connection) node.

The network element may in particular be or comprise a DSLAM, a cabinet or any telecommunication node that allows connecting or patching of subscribers. The network element may in particular comprise a cable node and/or an MSAN. It is an option that the MSAN is part of the cable node or arranged in the vicinity of the cable node. The MSAN may be any device comprising a connection to a high speed network, e.g., an optical network or any type of aggregation network.

In some implementations, the first service line is a connection to a central office and/or wherein the second service line is a connection to a high-speed network, an IP network, an aggregation network or an optical network.

The first service line may provide, e.g., PSTN and/or ADSL services; the second service line may provide VDSL and subsequent (i.e. VDSL2, SHDSL, G.Fast, etc.) services.

In some implementations, the network element further comprises a control element to control the switch, wherein the control element is coupled to the second service line and the control element is arranged to trigger the switch based on a signal received via the second service line.

The control element may comprise a control unit and a decoding element (the latter being also referred to as "protection and power circuitry").

In some implementations, the second service line is connected to a line card, said line card providing a MELT functionality or a DSL functionality.

Either the MELT functionality (from a MELT controller or a line card with a MELT function) or the DSL functionality can be used to convey a signal (signature, command) to trigger the at least one switch via the control element.

In some implementations, the line card provides a supply voltage for the control element.

Either the MELT functionality or the DSL functionality can be used to convey power and/or control or configuration information to the control element.

In some implementations, the control element is arranged to control two or more switches.

Hence, a matrix of switches can be controlled via the control element. The control element may obtain an information how to control the two or more switches via the second service line. This information may be sent from a MELT controller on a VDSL line card or by a VDSL line card with an integrated MELT function.

In some implementations, the switch is an MDF-switch comprising
- a first port to the first service line, a second port to the second service line and a third port to which the subscriber line is connected,
- a control unit,
- a first relay,
- a decoding element which is connected to the second port, wherein the decoding element is arranged
  - to detect a signature that reaches the second port,
  - to supply the signature to the control unit
- wherein the control unit controls the first relay based on the signature.

The control unit and the decoding element may be arranged as a single component or as distributed components. The signature may comprise a signal that is modulated onto a base signal that is conveyed across the second service line. The second service line may be directly or indirectly connected to a CO or to a MSAN.

The signature may be conveyed by a line card, in particular by a MELT component or a MELT functionality.

In some implementations, the MDF-switch further comprises a filter between the first port and the second port, wherein the filter is at least partially switchable via a second relay that is controlled by the control unit depending on the signature detected by the decoding element.

The filter may in particular comprise at least one low-pass filter and at least one high-pass filter.

Also, a system is suggested comprising:
- two or more switches, wherein each switch is configurable to connect a subscriber line to a first service line or to a second service line,
- a control circuitry for controlling the two or more switches,
- an MSAN comprising two or more second service lines, wherein a dedicated service line of an MSAN is used for controlling the control circuitry.

The MSAN (also referred to as IP installation) may be a network component comprising a high-speed network access, e.g., based on a DSL technology such as VDSL, VDSL2, SHDSL, ADSL, G.Fast, etc. It may be connected to an optical network or an aggregation network of any kind.

In some implementations, the MSAN comprises a MELT functionality and/or a DSL functionality, wherein the MELT functionality and/or the DSL functionality is used for controlling and/or supplying the control circuitry via the dedicated service line.

In some implementations, the two or more switches and the control circuitry are part of a cable (connection) node.

The MSAN may be part of the cable node or the cable node may be part of the MSAN. As an alternative, the MSAN and the cable node may be arranged as separate entities.

In some implementations, the first service line is a connection to a central office and/or wherein the second service line is a connection to a high-speed network, an IP network, an aggregation network or an optical network.

Also, a method is provided for operating a network element, wherein the network element comprises at least one switch, which is configurable to connect a subscriber line to a first service line or to a second service line, the method comprising the steps:
- determining a signature conveyed across the second service line,
- configuring the connection of the subscriber line to the first service line or to the second service line based on the signature.

Also, a method for operating a system comprising two or more switches is suggested, wherein each switch is configurable to connect a subscriber line to a first service line or to a second service line, a control circuitry for controlling the two or more switches, an MSAN comprising two or more second service lines, a dedicated service line of an MSAN connecting one port of the MSAN with the control circuitry, the method comprising:
- conveying a signal via the dedicated service line;
- determining a signature based on the signal;
- controlling by the control circuitry the two or more switches based on the signature.

In some implementations, the signal comprises a supply voltage for operating the control circuitry.

It is noted that the steps of the method stated herein may be executable on the respective device or system.

The solution provided herein further comprises a computer program product directly loadable into a memory of a digital computer, comprising software code portions for performing the steps of the method as described herein.

In addition, the problem stated above is solved by a computer-readable medium, e.g., storage of any kind, having computer-executable instructions adapted to cause a computer system to perform the method as described herein.

Furthermore, the problem stated above is solved by a communication system comprising at least one device as described herein.

BRIEF DESCRIPTION OF THE DRAWINGS

Like reference numbers and designations in the various drawings indicate like elements.

DETAILED DESCRIPTION

According to an example implementation, an MDF-switch (MDF: Main distribution frame) for at least one subscriber port can be plugged onto the MDF of the cabinet, e.g., a DSLAM, where the copper line from a VDSL port terminates. This can be done when the cabinet is installed or manufactured. The MDF-switch comprises three interfaces, also referred to as ports A, C and V:

Port A: This port A is connected to an ADSL2+/PSTN subscriber line coming from the CO.

Port C: This port C is connected to the subscriber line coming from the customer premises (connected to, e.g., a CPE).

Port V: This port V is connected to the subscriber line coming from the VDSL port.

Figure 1:
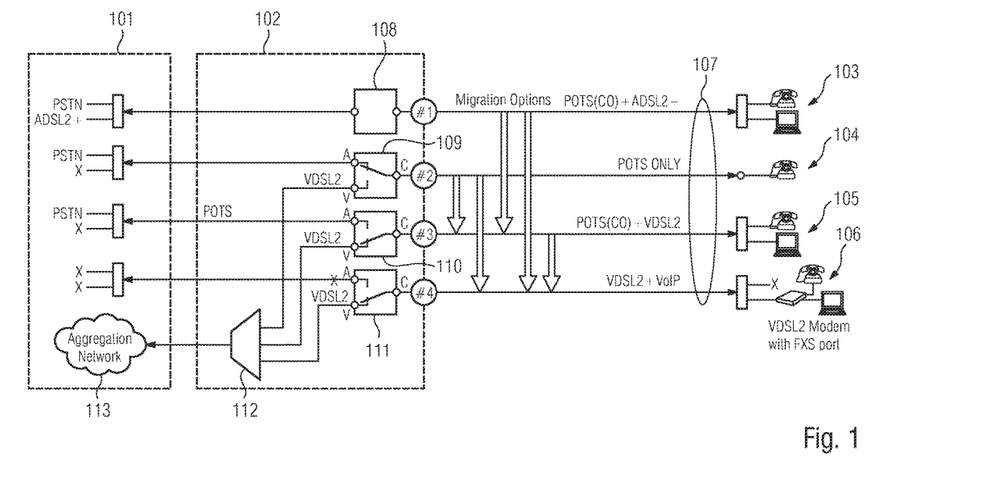
FIG. 1 shows an example block diagram comprising visualizing various migration scenarios utilizing flexibly controlled MDF-switches in a DSLAM cabinet.

FIG. 1 shows an example block diagram comprising a CO 101, a DSLAM cabinet 102 and two or more customers, i.e. subscribers (CPEs) 103 to 106. The DSLAM cabinet 102 comprises MDF-switches 109 to 111, a multi-service access node (MSAN) 112 as well as a non-switched connection 108. Each of the MDF-switches has the ports A, V and C as described above. The MSAN 112 is connected to an aggregation network 113, which may be part of the CO 101 or external to the CO 101.

In this example, the customer 103 uses POTS and ADSL2+ services, which are provided by the CO 101. The DSLAM cabinet provides the connection 108 between the CO 101 and the customer 103.

The customer 104 uses POTS only. For this customer 104, the DSLAM cabinet provides the MDF-switch 109 with its port A connected to the CO 101, its port C connected towards the customer 104 and its port V connected to the MSAN 112. As indicated in FIG. 1, the MDF-switch 109 is controlled such that its port A is connected to its port C, hence POTS only is conveyed from the CO 101 to this customer 104.

The customer 105 uses POTS provided by the CO 101 and VDSL2 services. For this customer 105, the MDF-switch 110 is controlled such that its port V is connected to its port C; hence VDSL services are supplied towards this customer 104. Port A and port V can internally be connected via a low-pass filter which would allow the customer 105 to still obtain the POTS service from the CO 101. If the customer 104 decides to use a VoIP service, the PSTN equipment in the CO 101 can be decommissioned and the connection between CO and port A can be disconnected.

The last use case is shown for the example customer 106 using VDSL2 services and VoIP services. For this customer 106, the MDF-switch 111 is controlled such that its port V is connected to its port C. No connection to the CO 101 is required for the customer 106.

In this example shown in FIG. 1, the physical connections from the DSLAM cabinet 102 to the various customers 103 to 106 are at least partially combined in a single cable binder 107.

FIG. 1 also indicates the following example migration options:
(a) The customer 103 may be migrated from CO-only services to the scenario described for customer 105 or customer 106. In such case, the permanent connection 108 can be replaced by an MDF-switch, which can be flexibly controlled as described.
(b) The customer 104 may be migrated to the scenario described for customer 105 or customer 106 by controlling the MDF-switch such that the port V is connected to the port C (see use cases for customers 105 and 106 described above).
(c) The customer 105 may be migrated to the scenario described for customer 106 by using VoIP services instead of PSTN services.

One example use case may be as follows: When the MDF-switch is installed, port A and port C are connected with each other (this is also referred to as "rest position"). Hence, the subscriber gets the services (ADSL2+/PSTN) from the CO. When the subscriber wishes to obtain the new VDSL2 service, a VDSL2 line card sends a signal to the MDF-switch to connect its port C with its port V. The subscriber line coming from the CPE is then connected to the VDSL2 port of the DSLAM.

Hence, the MDF-switch allows the operator to flexible provide services either from the CO or from the FTTN network. The MDF-switch may be controlled by a MELT controller on the VDSL line card. This bears the advantage that no external control equipment with additional wiring is required. It is also an option that the MDF-switch is controlled by VDSL line cards with integrated MELT function. Further, the MDF-switch may be small and/or it may comprise a POTS splitter. In such case, the MDF-switch can be plugged onto the VDSL port where needed.

The solution presented may comprise at least one of the following further advantages:
- The MDF-switch can be controlled by the VDSL line card of a DSLAM. In such case, no additional control equipment or control wiring is required.
- Existing line cards may be used; in particular, no redesign is required, a software upgrade of the line card may suffice.
- The approach allows for a compact design with a built-in POTS-splitter, which is beneficial with regard to the overall space required.
- Subscribers can be individually plugged onto the VDSL line via the MDF-switch; this bears the advantage of a freely and flexibly scalable solution.
- A true switch-off of the subscriber line from the CO is supported; hence, no VDSL signal power degradation and central office ADSL2+ disturbance occur.
- POTS service from the CO and VDSL2 service from the cabinet are supported (in case of integrated low-pass and high-pass filters).
- Data only services are supported.

It is also an option that the setting of the MDF-switch can be controlled via the PSTN or ADSL(2+) services provided by the CO. Hence, these services may be used to trigger the MDF-switch such that the port A is connected to the port C or that the port V is connected to the port C.

It is also an option that configuration signals for triggering the MDF-switch can be supplied either the port A or the port V or both such ports.

Figure 2:
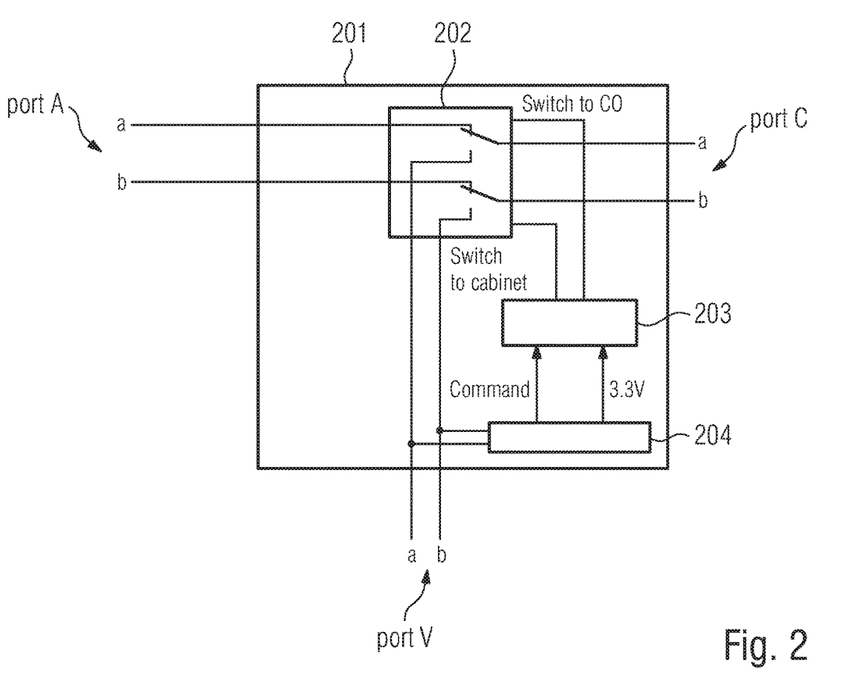
FIG. 2 shows a block diagram of an MDF-switch, which comprises a port A, a port C, a port V, a latching relay, a control unit and a protection and power circuitry (also referred to as decoding element)

FIG. 2 shows a block diagram of an MDF-switch 201, which comprises a port A, a port C, a port V, a latching relay 202, a control unit 203 and a protection and power circuitry 204 (also referred to as decoding element). In a rest position, the port A is connected to the port C thereby connecting the CO line with a CPE, i.e. the customer gets the service provided by the CO.

The port V is connected to a first input of the relay 202 and the port A is connected to a second input of the relay 202. The output of the relay 202 is connected to the port C. The protection and power circuitry 204 is connected to the port V thereby being able to determine when predefined signals reach this port V. Such signal may be conveyed as a command or signature to the control unit 203. The protection and power circuitry 204 comprises a protection functionality and it provides a supply voltage, e.g., 3.3V., to the control unit 203. The control unit 203 controls the relay 202 to either connect the port A with the port C or the port V with the port C. The protection functionality may in particular comprise an overvoltage protection.

If the customer wants to obtain a VDSL2 service, the line card via the port V sends a DC voltage with a predefined signature, e.g. a pulsed 800 Hz tone, to the MDF-switch 201. This predefined signature is extracted by the protection and power circuitry 204 and conveyed to the control unit 203. If the control unit 203 detects this signature, it switches the relay 202 to connect the port V with the port C, i.e. the VDSL2 service to the CPE.

The relay 202 may be arranged such that it maintains ("latch to") its latest switching state even without any DC voltage supplied.

If the customer wants to obtain the service from the CO, the line card via the port V sends a corresponding signature to the MDF-switch 201. The control unit 203 detects this signature and switches the relay 202 to connect the port A with the port C. If a relay is arranged to switch between two states, one signature can be used to trigger such switching. Hence, it is an option to use a single signature as a trigger for switching or two or more signatures, each associated with a switching state. It is also an option the one signature is used to trigger a change from one state to a next state. It is therefore possible that several (even more than two) switching states are selected by a single signature according to a round robin approach.

The MDF-switch 201 may be controlled by any line card that is able to send the DC voltage plus a signature tone onto the subscriber line; this may include signals sent from the CO. The MDF-switch 201 may comprise a microcontroller that is able to detect an absence and/or a presence of a POTS line (from the CO). If the POTS line is interrupted, the MDF-switch 201 may be triggered to connect the port C with the port V. In order to avoid any erroneous switching, e.g., due to a temporary outage of the PTOS line, the DC plus a signature tone may in particular have a unique or unambiguously detectable signature profile in order to trigger a proper switching condition.

Figure 3:
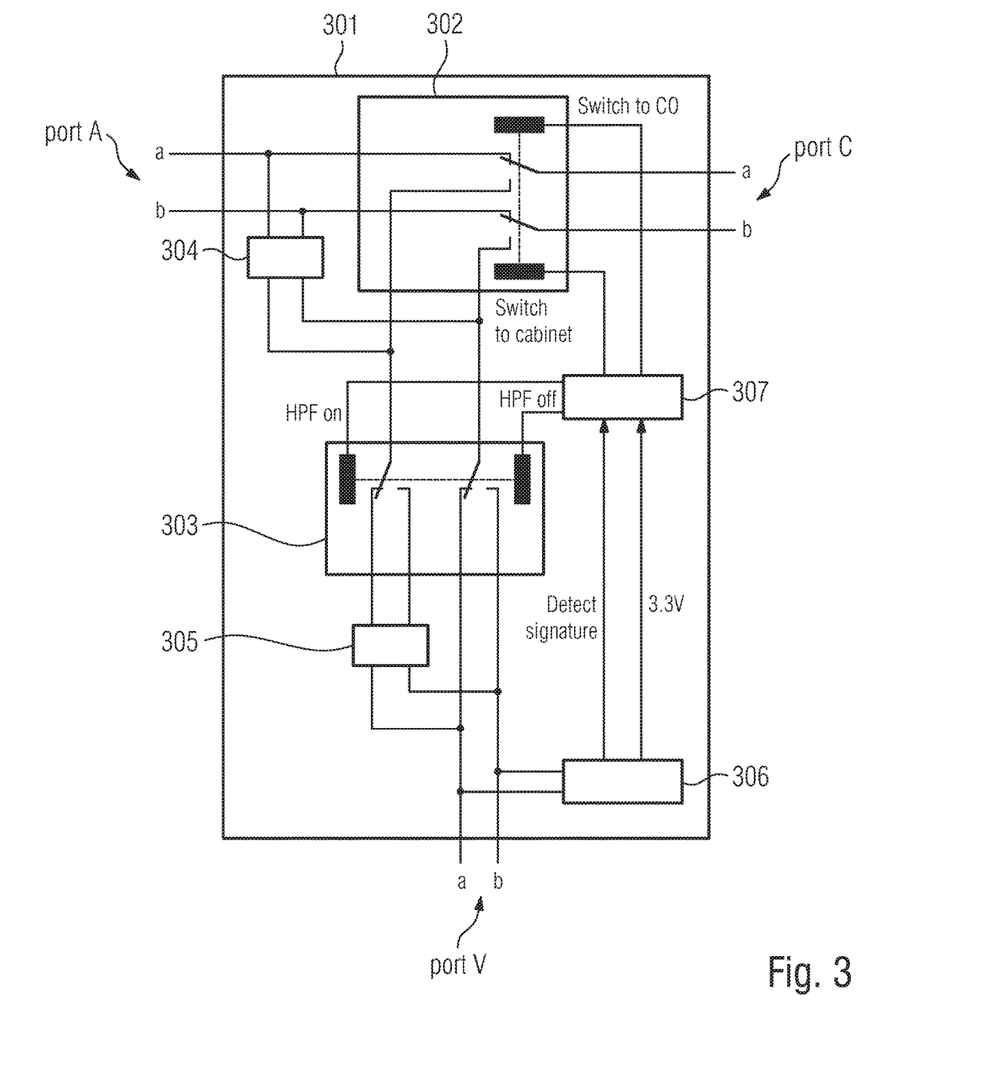
FIG. 3 shows a block diagram of an MDF-switch, which comprises a port A, a port C, a port V, relays, an integrated POTS-splitter comprising a low-pass filter and a high-pass filter a control unit and a protection and power circuitry (also referred to as decoding element)

FIG. 3 shows a block diagram of an MDF-switch 301, which comprises a port A, a port C, a port V, a relay 302, a relay 303, an integrated POTS-splitter comprising a low-pass filter (LPF) 304 and a high-pass filter (HPF) 305, a control unit 307 and a protection and power circuitry 306 (also referred to as decoding element).

The switching states of the relays 302 and 303 are controlled via signals applied to the port V. Such a signal is received by the protection and power circuitry 306 and transformed into a command or signature. The protection and power circuitry 306 is also used to supply the control unit 307 with a supply voltage (e.g., 3.3V). The protection and power circuitry 306 conveys the signature detected towards the control unit 307, which acts according to this signature. Hence, the signature is used to encode an instruction as how the control unit 307 should control the relays 302 and 303. Different instructions for different switching states can be conveyed as different signatures. Each signature can be encodes as a modulated signal that is applied on top of the signals obtained via the port V. For example, a predefined frequency or frequency range can be used for the modulated signal. This frequency or frequency can then be filtered out by the protection and power circuitry 306 to detect whether a signature can be found for controlling any of the relays 302 or 303.

The relay 303 is used to switch the HPF 305 on or off and the relay 302 is used to either connect the port A with the port C or the port V with the port C. The port V is connected to a first input of the relay 303 and the port V is connected via the HPF 305 to a second input of the relay 303. The output of the relay 303 is connected to a first input of the relay 302 and the output of the relay 303 is connected via the LPF 304 to a second input of the relay 302. The second input of the relay 302 is also connected to the port A. The output of the relay 302 is connected to the port C.

The input of the protection and power circuitry 306 is connected to the port V and one of its outputs conveys the detected signature (or command) towards the control unit 307, the other of its outputs coveys the supply voltage to the control unit 307.

The outputs of the control unit 307 control the switching states of the relay 302 and the relay 303.

It is noted that each of the ports and thus each connection to the ports or any of the components of the MDF-switch may comprise two physical wires, which are also referred to as wires a and b.

The HPF 305 is bypassed when the port C is connected to the port V, i.e., in case the CPE is connected to VDSL2, to enable MELT of the subscriber line. In this scenario, the relay 303 is switched to connect its first input (without the HPF) to its output and the relay 302 is switched to connect its first input to its output.

This solution enables the customer at the port C to obtain the VDSL service via the port V from the cabinet. Due to the connection of the port A to the first input of the relay 302 (and the output of the relay 303) via the LPF 304, however, the customer at the port C may still obtain the POTS via the port A from the CO. This gives the operator the flexibility to either provide the POTS from the CO or by VoIP to the customer at the port C.

It is noted that the relay 303 may be switched to connect its second input with its output (i.e. utilizing the HPF 305) in case the relay 302 is switched such that its second input is connected to its output (i.e. connecting the port A to the port C). The combination of LPF 304 and HPF 305 in the path between the port A and the port V avoids disturbances affecting the connection between ports A and V.

Controlling Cable Node

An example is directed to use IP-only equipment for a remote switchover of POTS connections to IP-only connections.

The POTS to IP-only switchover can be made by a relay inside a cable node. According to an example, the control circuit for this relay may be connected to and operated by the IP-only equipment.

State-of-the-art telecommunication equipment used by the telecommunication companies offers measuring functionalities for two-wire copper connections. This is provided in parallel to the DSL functionality and can work during a synchronized connection. It is possible to measure resistances, capacitances and other values as well as generate a current for sanity purposes. To provide these functionalities the measuring circuit generates positive and negative DC voltages (e.g. +60V/−60V). These voltages (and currents) may be used for other purposes.

Network operators have their net equipment spread over a large area and there is a mix of "older" and "newer" connection technologies. It is a requirement to switch a customer from POTS (old) equipment to IP-only (new) equipment. This however, should preferably be done quickly and as flexibly as possible without incurring high costs, which may in particular stem from the fact that a technician has to appear on site and manually perform the task of locally patching lines at the cable connection point. This is in particular tricky as usually not all customers connected to that connection point want to switch at the same time; hence, the appearance on site would be required more than once, which further increases the costs for such migration.

According to an example implementation, a remote switchover function is provided to allow for the operator to cost-efficiently, quickly and flexibly adjust the migration of the customers to various services. The example uses available hardware and wiring and provides an additional switching component.

The MELT and DSL circuits can be used to control switchover relays at the cable node.

In an example implementation, a single port of an IP-only service providing equipment may be utilized for this purpose: This particular port may preferably not have a connection to a customer; however it is also an option that this port is actually connected to a customer.

The MELT circuit may provide power for the switchover circuit and can be used to transmit instructions indicating which port has to be switched. The DSL circuit may be used in addition for enhanced communication capabilities.

Hence, such approach bears the advantage that a MELT functionality can be used to power a distant switchover circuit and to send switchover messages (unidirectional). In addition, the DSL functionality may be used to send and receive switchover messages (bidirectional).

Figure 4:
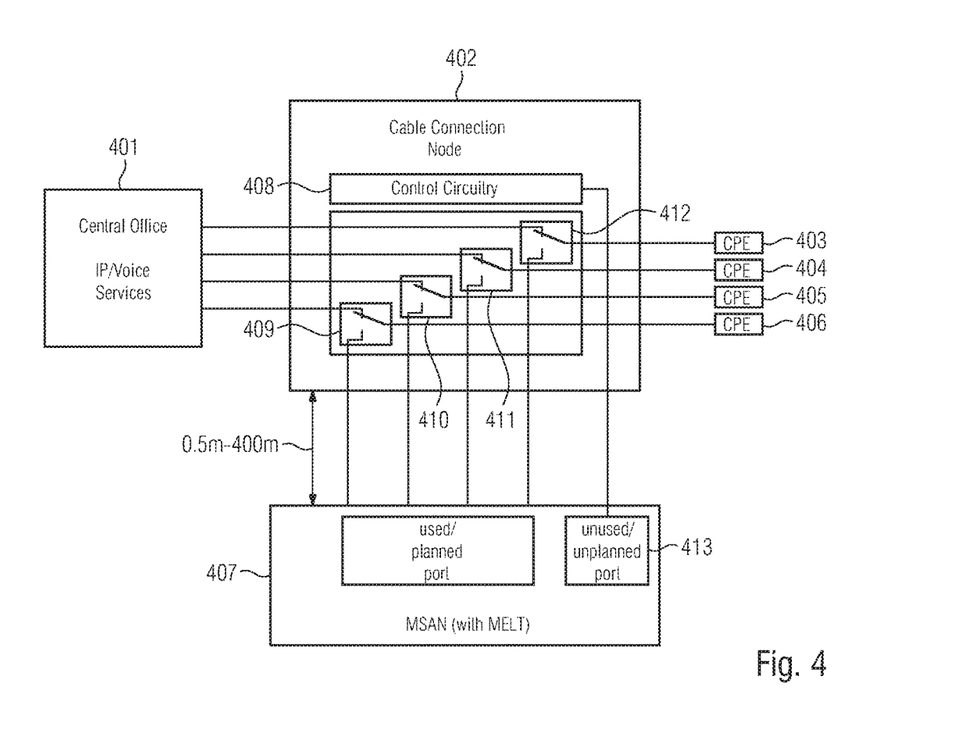
FIG. 4 shows an example embodiment comprising a CO, a cable connection node, CPEs and an MSAN, wherein the MSAN supplies MELT functionality towards the cable connection node to drive and operate the relays.

FIG. 4 shows an example implementation comprising a CO 401, a cable connection node 402, CPEs 403 to 406 and an MSAN 407. The MSAN 407 may be arranged inside the cable connection node 402 or separate to it; it may be deployed at a distance from, e.g., 0.5 m to 400 m from the cable connection node 402.

The cable connection node 402 is equipped with a manual switching matrix to perform the service switch-over by placing connectors. The switching can be controlled remotely via latching relays 409 to 412, each of which connects a CPE either to the CO 401 or to the MSAN 407. The MSAN may 407 may be an installation that provides IP services, e.g., via VDSL2.

A control circuitry 408 (relay control circuitry) may be connected to each of the relays 409 to 412. If no additional power supply unit is to be provided in the cable connection node 402, the control circuitry 408 can be powered externally via the MSAN 407. As shown in FIG. 4, a single port 413 of the MSAN 407 can be used to provide power and control information to the control circuitry 408 of the cable connection node 402. Hence, the power and control information can be supplied utilizing the MELT functionality of the MSAN 407.

The information required for switching any of the relays 409 to 412 is hence transmitted from the MSAN 407 via said port 413. A signature or any modulation may be used to convey such information from the MSAN 407 to the control circuitry 408.

It is an option to remove the control circuitry 408 if it is no longer required; this may free the port 413 which may then be used to convey payload to the customer.

It is also an option to convey information for switching the relays 409 to 412 via the DSL functionality (instead of the MELT functionality). In such scenario, the MELT functionality may be used for conveying power from the MSAN 407 to the control circuitry 408.

Another option may be to provide a (separate) power supply for the relays 409 to 412 and the control circuitry 408. This power supply may be added to the cable connection node 402. In such case, the MELT functionality may be used for conveying information for switching the relays 409 to 412 from the MSAN 407 to the control circuitry 408.

The solution described may in particular be utilized for a task where a remote command refers to a hardware switching functionality, e.g., to switch power on/off for a special device or to lock/unlock secured equipment.

Although various embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

LIST OF ABBREVIATIONS

ADSL Asymmetric Digital Subscriber Line
AMDF Automatic Main Distribution Frame
CO Central Office
CPE Customer Premise Equipment
DC Direct Current
DSL Digital Subscriber Line
DSLAM DSL Access Multiplexer
EBM Enhanced Broadband Migration
FTTC Fiber To The Curb
FTTN Fiber To The Node
HPF High Pass Filter
LPF Low Pass Filter
MDF Main Distribution Frame
MELT Metallic Ended Line Test
MSAN Multi Service Access Node
POTS Plain Old Telephone Service
PSTN Public Switched Telephone Network
VDSL Very High Digital Subscriber Line
VDSL2 Very High Digital Subscriber Line 2 (2nd Generation)
VoIP Voice over IP

The invention claimed is:

1. A network element comprising:
    at least one switch, which is configurable to connect a subscriber line to one of a first service line or a second service line,
    wherein the switch toggles a connection of the subscriber line between the first service line and the second service line based on receipt of a signal conveyed to the network element across the second service line, and wherein the signal, transmitted by a line card connected to the second service line, comprises a Direct Current (DC) voltage as well as a signature tone indicating that a current connection of the switch to one of the first service line or the second service line is to be toggled to connect the switch to a different one of the first service line or the second service line.

2. The network element of claim 1, wherein the network element is a cable node.

3. The network element of claim 1, wherein the first service line is a connection to a central office, wherein the second service line is a connection to a high-speed network, an IP network, an aggregation network, or an optical network, and wherein the connection of the second service line is external to the central office.

4. The network element of claim 1, further comprising a control element to control the switch, wherein the control element is coupled to the second service line and the control element triggers the switch based on a signal received via the second service line.

5. The network element according to claim 4, wherein the control element controls two or more switches.

6. The network element of claim 1, wherein the line card providing a MELT functionality or a DSL functionality.

7. The network element according to any claim 1, wherein the switch is an MDF-switch comprising
a first port to the first service line, a second port to the second service line and a third port to which the subscriber line is connected,
a control unit,
a first relay,
a decoding element which is connected to the second port, wherein the decoding element:
detects a signature that reaches the second port,
supplies the signature to the control unit,
wherein the control unit controls the first relay based on the signature.

8. The network element according to claim 7, wherein the MDF-switch further comprises a filter between the first port and the second port, wherein the filter is switchable via a second relay that is controlled by the control unit depending on the signature detected by the decoding element.

9. A system comprising:
two or more switches, wherein each switch is configurable to connect a subscriber line to one of a first service line or a second service line, and each switch toggles a connection of the corresponding subscriber line between the first service line and the second service line based on receipt of a signal,
a control circuitry for controlling the two or more switches,
a Multi Service Access Node (MSAN) comprising two or more second service lines,
wherein the signal conveyed across a dedicated service line of the MSAN is used for controlling the control circuitry, and wherein the signal, transmitted by a line card connected to the dedicated service line, comprises a Direct Current (DC) voltage as well as a signature tone indicating that a current connection of a particular switch to one of the first service line or the second service line is to be toggled to connect the particular switch to a different one of the first service line or the second service line.

10. The system according to claim 9, wherein the MSAN comprises a MELT functionality or a DSL functionality, wherein the MELT functionality or the DSL functionality is used for controlling or supplying the control circuitry via the dedicated service line.

11. The system according to claim 9, wherein the two or more switches and the control circuitry are part of a cable node.

12. The system according to any of claim 9, wherein the first service line is a connection to a central office and wherein the second service line is a connection to a high-speed network, an IP network, an aggregation network or an optical network.

13. A method for operating a network element, wherein the network element comprises at least one switch, which is configurable to connect a subscriber line to one of a first service line or a second service line, the method comprising the steps:
determining a signature tone based on a signal conveyed to the network element across the second service line, wherein the signal, transmitted by a line card connected to the second service line, comprises a Direct Current (DC) voltage as well as the signature tone indicating that a current connection of the at least one switch to one of the first service line or the second service line is to be toggled to connect the at least one switch to a different one of the first service line or the second service line,
configuring a connection of the subscriber line to one of the first service line or the second service line, including toggling the at least one switch from the first service line to the second service line based on the signature tone.

14. A method for operating a system comprising two or more switches, wherein each switch is configurable to connect a subscriber line to one of a first service line or a second service line, a control circuitry for controlling the two or more switches, an MSAN comprising two or more second service lines, a dedicated service line of the MSAN connecting one port of the MSAN with the control circuitry, the method comprising:
conveying a signal via the dedicated service line, wherein the signal, transmitted by a line card connected to the dedicated service line, comprises a Direct Current (DC) voltage as well as a signature tone indicating that a current connection of a particular switch to one of the first service line or the second service line is to be toggled to connect the particular switch to a different one of the first service line or the second service line;
determining the signature tone based on the signal;
controlling by the control circuitry the two or more switches based on the signature tone.

15. The method according to claim 14, wherein the signal comprises a supply voltage for operating the control circuitry.

16. The network element of claim 4, wherein the line card provides a supply voltage for the control element.

17. The network element of claim 1, wherein the first service line provides at least one of Public Switched Telephone Network (PSTN) service or Asymmetric Digital Subscriber Line (ADSL) service, and the second service line provides one of Very High Digital Subscriber Line (VDSL) service, VDSL2 service, Symmetrical High-speed Digital Subscriber Line (SHDSL) service, or G.Fast service.

* * * * *

UNITED STATES PATENT AND TRADEMARK OFFICE
CERTIFICATE OF CORRECTION

PATENT NO. : 10,063,690 B2
APPLICATION NO. : 15/084772
DATED : August 28, 2018
INVENTOR(S) : Ruediger Schalk et al.

Page 1 of 1

It is certified that error appears in the above-identified patent and that said Letters Patent is hereby corrected as shown below:

In the Claims

In Column 11, Line 3, Claim 7, after "to" delete "any".

In Column 11, Line 50, Claim 12, after "to" delete "any".

In Column 12, Claim 17, Line 51, delete "Very High Digital Subscriber Line (VDSL)", and insert --Very High Speed Digital Subscriber Line (VDSL)--, therefor.

Signed and Sealed this
Ninth Day of October, 2018

Andrei Iancu
*Director of the United States Patent and Trademark Office*